United States Patent
Li

(10) Patent No.: US 11,118,989 B2
(45) Date of Patent: Sep. 14, 2021

(54) PROCESS DIAPHRAGM SEAL

(71) Applicant: Rosemount Inc., Shakopee, MN (US)

(72) Inventor: Baogang Li, Beijing (CN)

(73) Assignee: ROSEMOUNT INC., Shakopee, MN (US)

(*) Notice: Subject to any disclaimer, the term of this patent is extended or adjusted under 35 U.S.C. 154(b) by 188 days.

(21) Appl. No.: 16/088,569

(22) PCT Filed: Jul. 13, 2018

(86) PCT No.: PCT/CN2018/095583
§ 371 (c)(1),
(2) Date: Sep. 26, 2018

(87) PCT Pub. No.: WO2020/010606
PCT Pub. Date: Jan. 16, 2020

(65) Prior Publication Data
US 2020/0018660 A1    Jan. 16, 2020

(51) Int. Cl.
*G01L 7/08* (2006.01)
*G01L 19/00* (2006.01)
(Continued)

(52) U.S. Cl.
CPC .............. *G01L 7/082* (2013.01); *F16J 3/02* (2013.01); *G01L 19/0046* (2013.01); *G01L 19/0645* (2013.01)

(58) Field of Classification Search
CPC ............ G01L 19/0044; G01L 19/0046; G01L 19/0645; G01L 19/0672; G01L 7/082;
(Continued)

(56) References Cited

U.S. PATENT DOCUMENTS 2,224,145 A   12/1940  Dugan et al.
2,647,847 A   8/1953   Black et al.
(Continued)

FOREIGN PATENT DOCUMENTS

CN   87104155   11/1987
CN   1061082    5/1992
(Continued)

OTHER PUBLICATIONS

Notification of Transmittal of the International Search Repot and the Written Opinion of the International Searching Authority, from PCT/CN2018/095583, dated Apr. 22, 2019.
(Continued)

*Primary Examiner* — Nicholas L Foster
(74) *Attorney, Agent, or Firm* — Westman, Champlin & Koehler, P.A.

(57) ABSTRACT

A process diaphragm seal includes a seal body, a diaphragm, and a ring member. The seal body includes a flange that surrounds a cavity. The diaphragm includes an active portion that extends over the cavity and a peripheral portion that surrounds the active portion. The ring member clamps the peripheral portion of the diaphragm to an outer wall of the flange through an interference fit between an inner wall of the ring member and the outer wall of the flange. A seal is formed between the peripheral portion of the diaphragm and the outer wall of the flange.

16 Claims, 8 Drawing Sheets

(51) Int. Cl.
*F16J 3/02* (2006.01)
*G01L 19/06* (2006.01)

(58) Field of Classification Search
CPC ... G01L 13/025; G01L 2009/0066; F16J 3/02; Y10T 29/49865
See application file for complete search history.

(56) References Cited

U.S. PATENT DOCUMENTS

| | | | |
|---|---|---|---|
| 3,072,150 A * | 1/1963 | Hastings | G01L 7/082 |
| | | | 92/98 R |
| 3,579,805 A | 5/1971 | Kast | |
| 3,610,108 A | 10/1971 | Sorteberg | |
| 3,645,139 A | 2/1972 | Zavoda | |
| 3,675,540 A | 7/1972 | Murata et al. | |
| 3,814,119 A | 6/1974 | Bertrand et al. | |
| 4,046,010 A | 9/1977 | Akeley | |
| 4,136,603 A * | 1/1979 | Doyle, Jr. | B23K 9/232 |
| | | | 228/107 |
| 4,198,081 A | 4/1980 | Harrison et al. | |
| 4,199,991 A | 4/1980 | Kodama | |
| 4,768,382 A * | 9/1988 | Varrese | G01L 19/0046 |
| | | | 228/165 |
| 5,095,755 A | 3/1992 | Peterson | |
| 5,184,514 A * | 2/1993 | Gucci | G01L 19/0645 |
| | | | 228/262.42 |
| 5,230,248 A * | 7/1993 | Gucci | G01L 9/0044 |
| | | | 73/706 |
| 5,940,244 A | 8/1999 | Canlas et al. | |
| 6,038,961 A * | 3/2000 | Filippi | G01L 19/0645 |
| | | | 29/454 |
| 6,120,033 A | 9/2000 | Filippi et al. | |
| 6,637,110 B2 | 10/2003 | Jee | |
| 6,675,655 B2 | 1/2004 | Broden et al. | |
| 6,802,210 B2 | 10/2004 | Mitani et al. | |
| 7,117,745 B2 | 10/2006 | Broden | |
| 7,430,917 B2 * | 10/2008 | Hedtke | G01L 19/0007 |
| | | | 73/706 |
| 7,814,798 B2 * | 10/2010 | Filippi | G01L 19/0645 |
| | | | 73/715 |
| 9,513,183 B2 * | 12/2016 | Thompson | G01L 19/0645 |
| 10,378,984 B2 * | 8/2019 | Li | G01L 19/147 |
| 10,488,285 B2 * | 11/2019 | Chou | G01L 19/0645 |
| 10,514,311 B2 | 12/2019 | Xiaoang et al. | |
| 2004/0065144 A1 | 4/2004 | Mitani et al. | |
| 2005/0172738 A1 | 8/2005 | Broden | |
| 2007/0107188 A1 | 5/2007 | Jee et al. | |
| 2015/0377730 A1 | 12/2015 | Xiaoang et al. | |
| 2018/0245998 A1 * | 8/2018 | Li | G01L 19/147 |

FOREIGN PATENT DOCUMENTS

| | | |
|---|---|---|
| CN | 1487188 | 4/2004 |
| CN | 1654938 | 8/2005 |
| CN | 101338818 | 1/2009 |
| CN | 105203252 | 12/2015 |
| DE | 31 07 891 | 9/1982 |
| DE | 44 35 909 | 4/1995 |
| EP | 0 965 829 | 12/1999 |
| FR | 2 088 190 | 1/1972 |
| GB | 1 317 996 | 5/1973 |
| JP | 60-82827 | 5/1985 |
| WO | WO 2018/058487 | 4/2018 |

OTHER PUBLICATIONS

Office Action from Chinese Patent Application No. 201880001443.9, dated Dec. 3, 2020.
Communication Pursuant to Rules 161(2) and 162 from European Patent Application No. 18925955.9, dated Feb. 23, 2021.
Office Action from Chinese Patent Application No. 201880001443.9, dated Jul. 6, 2021.

* cited by examiner

PROCESS DIAPHRAGM SEAL

CROSS-REFERENCE TO RELATED APPLICATION

This Application is a Section 371 National Stage Application of International Application No. PCT/CN2018/095583, filed Jul. 13, 2018, not yet published, the contents of which are hereby incorporated by reference in their entirety.

TECHNICAL FIELD

Embodiments of the present disclosure relate to the process industry. More specifically, embodiments of the present disclosure relate to an isolation diaphragm or "diaphragm seal", such as the type used to couple an industrial process measurement instrument to an industrial process, in which a diaphragm is joined to a seal body using an interference fit.

DESCRIPTION OF THE RELATED ART

Some types of process measurement instruments, such as pressure transmitters, have a pressure sensor, which is typically used to measure a pressure of a process. An isolation diaphragm is typically used to isolate the pressure sensor from process to protect the pressure sensor from potentially damaging (e.g., corrosive) process materials, while communicating a pressure of the process through a substantially incompressible fill fluid. The pressure transmitter may be directly coupled to the process and include an isolation diaphragm dividing the process from the fill fluid. Alternatively, the pressure transmitter may be further displaced from the process through a remote isolation diaphragm that is directly coupled to the process and communicates the pressure of the process to the isolation diaphragm of the transmitter through a tube containing a fill fluid, which in turn communicates the sensed pressure to the pressure sensor through a fill fluid disposed in the transmitter housing.

Each isolation diaphragm may include part of a sub-assembly called a "remote seal" or a "diaphragm seal" that seals the process side of the diaphragm from the fill fluid side of the diaphragm. The diaphragm is typically bonded to a seal body, which supports the outer circumference of the active area of the diaphragm and allows an active inner portion of the diaphragm to deflect in response to pressure changes in the process fluid. It is critical that the diaphragm is bonded to securely seal the fill fluid within the seal body.

Metal diaphragms are attached to the seal body by welding or brazing the diaphragm to the seal body. Welding can hermetically join a metal diaphragm to the seal body. However, the welds and the heat-affected zones are susceptible to corrosion, which can cause the seal between the diaphragm and the seal body to be susceptible to leakage.

Polymer diaphragms may be attached to the seal body through mechanical bolting or thermal bonding techniques. Mechanical bolting techniques generally involve clamping the diaphragm, such as a polymer diaphragm between the seal body and a member, through which a pressure of a process may be transferred to the diaphragm. A seal is formed between the seal body and the member using O-rings. Bolts are used to press the O-rings and the seal body and member together to secure the diaphragm and seal the fill fluid within the seal body. This mechanical bolting technique is susceptible to leaks due to the unscrewing or loosening of the bolts from vibration and/or temperature changes, for example.

Thermal bonding of the polymer diaphragm to the seal body generally requires the surface of the metallic base material of the seal body to be treated using a laser or chemical process to form microstructures in the surface, which can grip the polymer diaphragm. Unfortunately, this thermal bonding process is expensive due to the laser equipment and chemical processes.

SUMMARY OF THE INVENTION

Embodiments of the present disclosure are directed to a process diaphragm seal, a method of forming the process diaphragm seal, and an industrial process control system that includes the process diaphragm seal. One embodiment of the process diaphragm seal includes a seal body, a diaphragm, and a ring member. The seal body includes a flange that surrounds a cavity. The diaphragm includes an active portion that extends over the cavity and a peripheral portion that surrounds the active portion. The ring member clamps the peripheral portion of the diaphragm to an outer wall of the flange through an interference fit between an inner wall of the ring member and the outer wall of the flange. A seal is formed between the peripheral portion of the diaphragm and the outer wall of the flange.

In some embodiments of the method of forming the process diaphragm seal, a temperature difference is created between a flange of a seal body, which surrounds a cavity of the seal body, and a ring member. A dimensional gap is created between an interior diameter of an inner wall of the ring member and an exterior diameter of an outer wall of the flange in response to the creation of the temperature difference. A diaphragm is positioned over the flange. An active portion of the diaphragm extends over the cavity in a peripheral portion of the diaphragm extends along the outer wall. The ring member is placed around the peripheral portion of the diaphragm and the flange, such that the peripheral portion is between the inner wall of the ring member and the outer wall of the flange. The temperatures of the seal body, the diaphragm and the ring member are equalized. The peripheral portion of the diaphragm is clamped between the inner wall of the ring member and the outer wall of the flange in response to the equalization of the temperatures. Additionally, a seal between the peripheral portion of the diaphragm and the outer wall of the flange is formed in response to the equalization of the temperatures.

One embodiment of an industrial process control system includes a process vessel containing a process material and a process diaphragm seal that is attached to the process vessel. The process diaphragm seal includes a seal body, a diaphragm, and a ring member. The seal body is connected to the process vessel and includes a flange surrounding a cavity. The diaphragm includes an active portion that extends over the cavity and a peripheral portion surrounding the active portion. The active portion has a first side that is exposed to the process material and a second side that is exposed to the cavity. The ring member clamps the peripheral portion of the diaphragm to an outer wall of the flange through an interference fit between an inner wall of the ring member and the outer wall of the flange. A seal is formed between the peripheral portion of the diaphragm and the outer wall of the flange. A fluid pathway is coupled to the cavity, and the cavity and the fluid pathway are filled with a fluid. A process transmitter of the system includes a pressure sensor that is configured to sense a pressure in the process vessel through the diaphragm and the fill fluid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
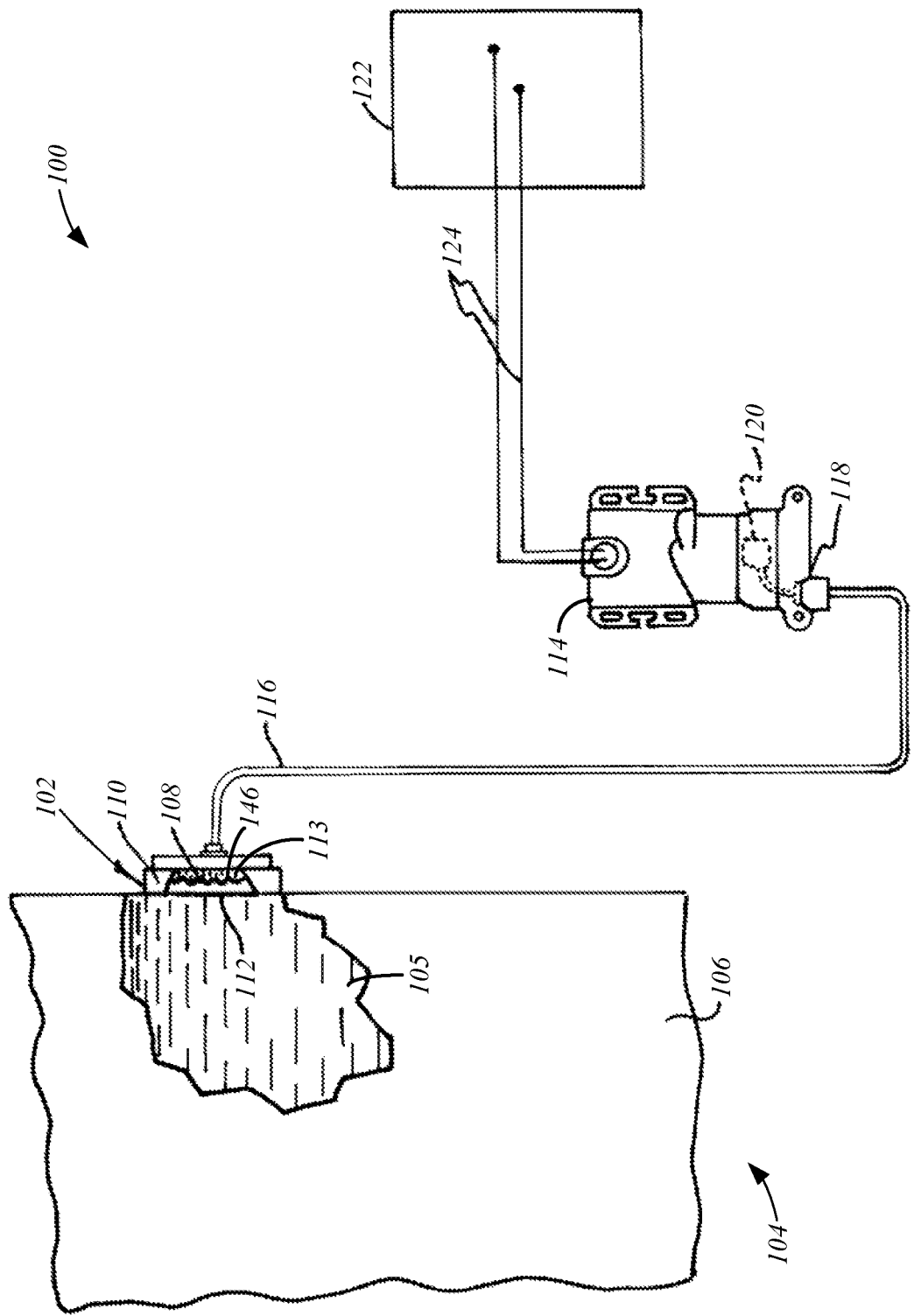
FIG. 1 is a simplified diagram of an exemplary industrial process control system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

FIG. 1 shows an exemplary industrial process control system 100 that may utilize a process diaphragm seal 102 formed in accordance with the present disclosure. The seal 102 may, for example, link a pressure of an industrial process 104, which may include a process material 105, such as a liquid, gas, slurry, or other material, contained in a process vessel 106, such as a tank or a pipe. The seal 102 includes a diaphragm 108 attached to a seal body 110. The diaphragm 108 of the seal 102 divides a process side 112, which is exposed to the process material 105, from a sensing side 113, which may be coupled to a process transmitter 114 (e.g., a pressure transmitter) through a fluid-filled tube 116. As mentioned above, the diaphragm 108 flexes or deflects in response to the pressure of the material 105 contained in the vessel 106. This movement of the diaphragm is communicated to the transmitter 114 through the fill fluid in the tube 116, while the fill fluid is isolated from the process material 105 by the seal 102.

The transmitter 114 may sense the communicated process pressure through another diaphragm seal 118 using a pressure sensor 120, in accordance with conventional process transmitters 114. It is understood that embodiments of the seal 102 described herein apply equally to the diaphragm seal 118 of the transmitter 114. Circuitry within transmitter 114 can convert the signal produced by sensor 120 into a form that is conducive for transmission to a remote location 122, such as a control room, over a two-wire control loop 124. Examples of such signals include digital signals and analog signals. Suitable analog signals may take the form of 4-20 milliamp signals, in which the level of the current indicates a value of a process variable, such as the process pressure. The current supplied over the control loop 124 may also power the transmitter 114. Exemplary digital communication signals include the modulation of digital signals onto the analog current level of the two-wire process control loop 124, such as in accordance with the HART® communication standard. Other purely digital techniques may also be employed including Fieldbus and Profibus communication protocols. Other communication techniques, such as wireless communication techniques, may also be employed by the transmitter 114 to communicate data to a desired location.

The diaphragm 108 of the seal 102 is attached to the seal body 110 through an interference fit. The interference fit coupling of the diaphragm 108 to the seal body 110 provides advantages over the welding and thermal bonding techniques described above. For example, in addition to being capable of securing metal and polymer (i.e., plastic) diaphragms 108 to the seal body 110, the interference fit coupling simplifies the assembly process relative to conventional welding and thermal bonding techniques, avoids the corrosion issues associated with conventional welding techniques, and provides a more economical solution to the thermal bonding techniques.

Figure 2:
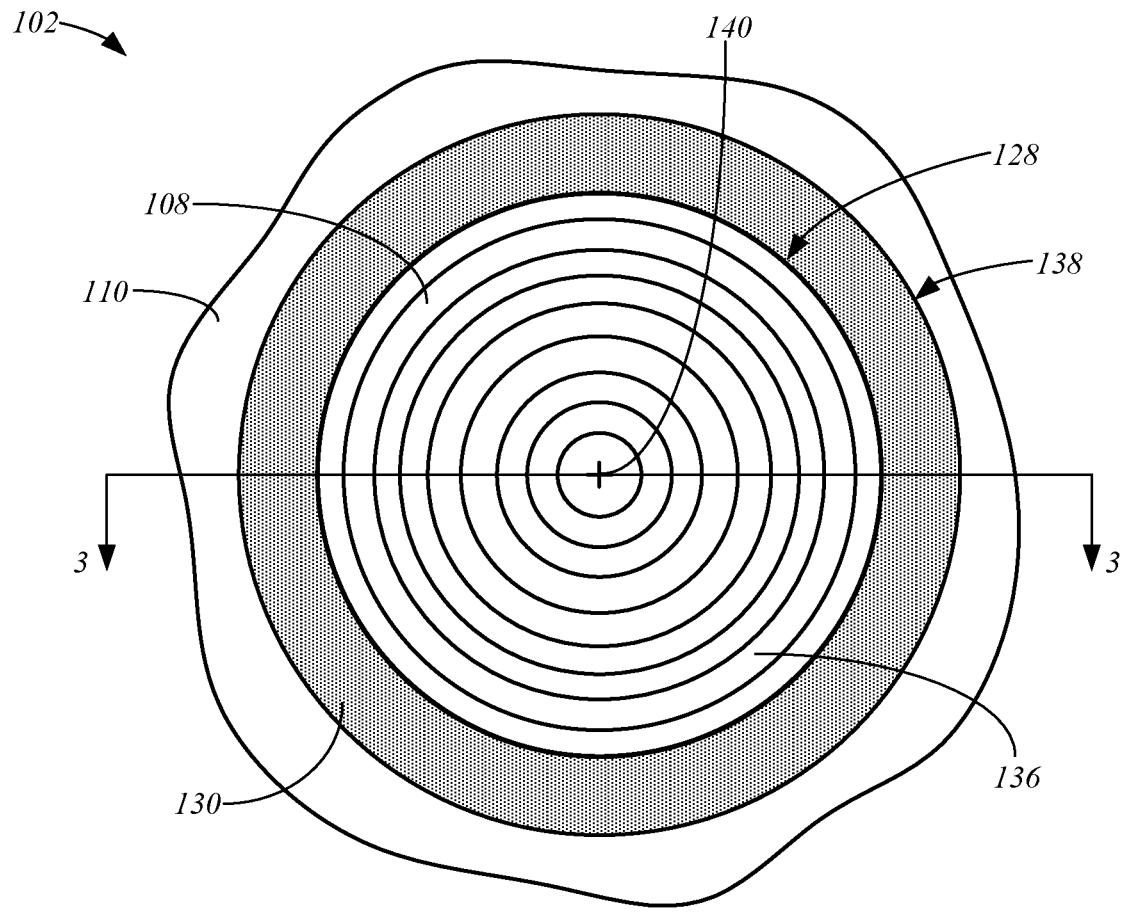
FIG. 2 is a simplified bottom view of the diaphragm seal, in accordance with embodiments of the present disclosure.
Figure 3:
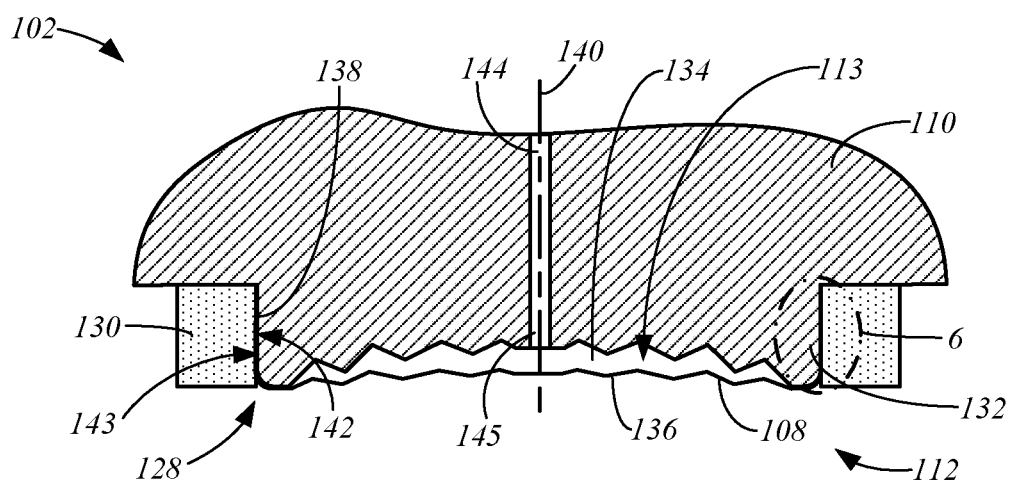
FIG. 3 is a simplified assembled cross-sectional view of the diaphragm seal of FIG. 2 taken generally along line 3-3.
Figure 4:
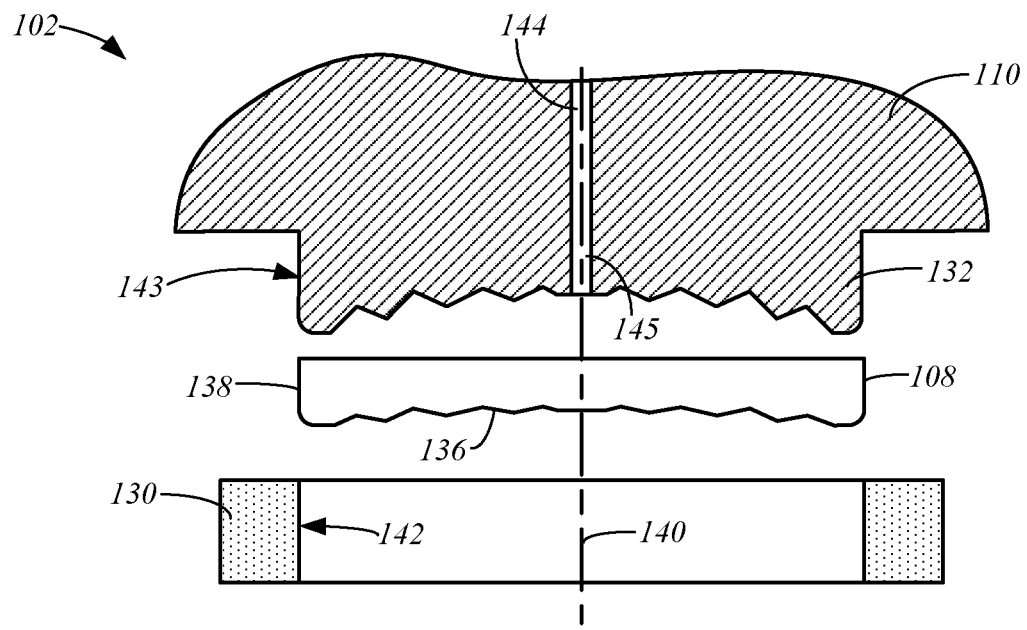
FIG. 4 is a simplified exploded cross-sectional view of the diaphragm seal of FIG. 3.

An exemplary diaphragm seal 102 in accordance with embodiments of the present disclosure is illustrated in FIGS. 2-4. FIG. 2 is a simplified bottom view of the diaphragm seal 102, FIG. 3 is a simplified assembled cross-sectional view of the diaphragm seal 102 of FIG. 2 taken generally along line 3-3, and FIG. 4 is a simplified exploded cross-sectional view of the diaphragm seal 102 of FIG. 3.

The interference fit 128 that joins the diaphragm 108 to the seal body 110 is formed using a ring member or ferrule 130. In some embodiments, the interference fit is formed between the ring member 130 and a flange 132 of the seal body 110, which surrounds a cavity 134, as shown in FIG. 3.

The ring member 130 and the flange 132 or seal body 110 may be formed of the same or different material. Exemplary materials that may be used to form the ring member 130 and/or the seal body 110 include, for example, stainless steel, such as 316L stainless steel, C-276 stainless steel, duplex 2205 stainless steel, duplex 2507 stainless steel, or another suitable material having desired thermal expansion or contraction properties.

In some embodiments, the diaphragm 108 is cup-shaped and includes an active portion 136 and a peripheral portion 138 that surrounds the active portion 136, as shown in FIG. 4. The active portion 136 of the diaphragm 108 extends over the cavity 134, and is configured to flex or deflect along a central axis 140 in response to changes in differential pressure between the process side 112 and the sensing side 113, which are indicated in FIG. 3. The peripheral portion 138 extends from the active portion 136. In some embodiments, the active portion extends substantially (e.g., ±10°) perpendicular to the axis 140, and the peripheral portion 138 extends substantially (e.g., ±10°) parallel to the axis 140, as shown in FIG. 4. The peripheral portion 138 of the diaphragm 108 extends between a cylindrical inner wall 142 of the ring member 130 and a cylindrical outer wall 143 of the flange portion 132, and is clamped to the seal body 110 by the interference fit 128 between the ring member 130 and the flange 132, as shown in FIG. 3. This also forms a seal between the peripheral portion 138 of the diaphragm 108 and the outer wall 143 of the flange 132, which seals the sensing side 113 of the cavity 134 from the process side 112.

In some embodiments, the seal body 110 includes a port 144, which may be coaxial to the central axis 140. The port 144 includes an end 145 that is open to the cavity 134. The other end of the port 144 may be fluidically coupled to a fluid pathway, such as the tube 116 (FIG. 1). The fluid pathway or tube 116 may also be coupled to a process transmitter 114. The cavity 134, the port 144, and the fluid pathway or tube 116 are filled with a fill fluid 146. Movements of the active portion 136 of the diaphragm 108 in response to pressure changes in the process 104 may be communicated to the transmitter 114 through the fill fluid 146, as discussed above with reference to FIG. 1.

Techniques for forming the interference fit 128 between the ring member 130 and the flange 132 will be described with reference to FIGS. 5A-E, and 6A-B. FIGS. 5A-E are simplified side cross-sectional views of the seal body 110 and the ring member 130 during different stages of assembly. Details of the components and the diaphragm 108 are not shown to simplify the illustration. FIGS. 6A-B are side cross-sectional views of the portion of the diaphragm seal 102 within circle 6 of FIG. 3 during different stages of assembly.

Figure 5A:
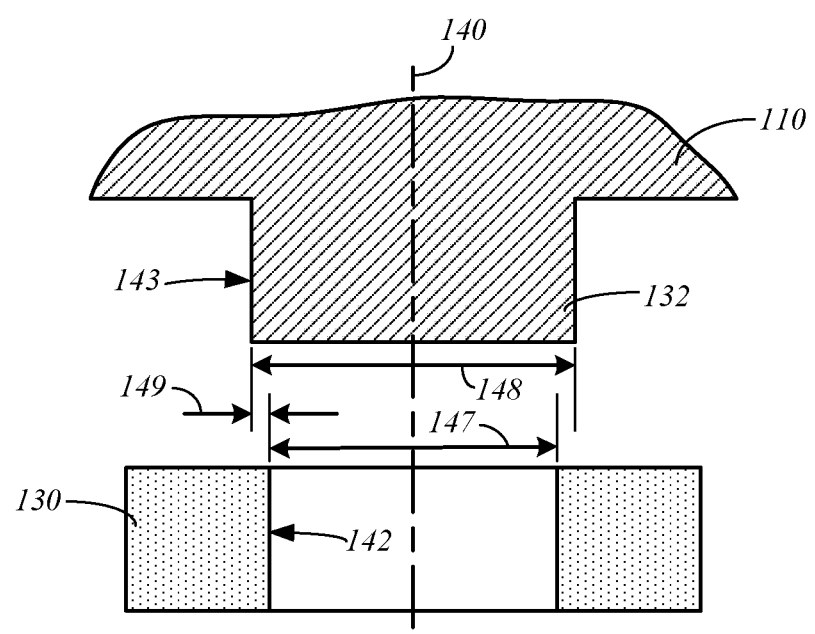
FIGS. 5A-E are simplified side cross-sectional views of the seal body 110 and the ring member 130 during different stages of assembly, in accordance with embodiments of the present disclosure.
Figure 6A:
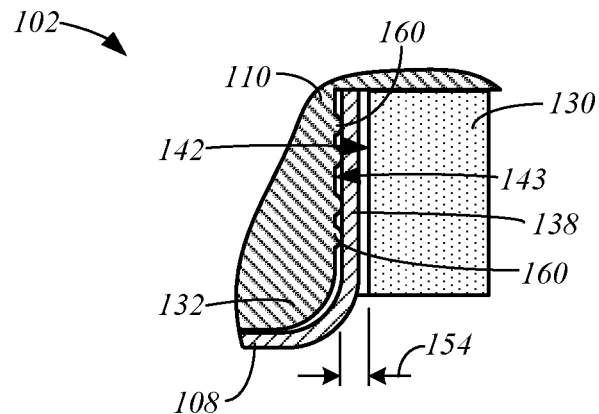
FIGS. 6A-B are side cross-sectional views of the portion of the diaphragm seal within circle 6 of FIG. 3 during different stages of assembly, in accordance with embodiments of the present disclosure.
Figure 6B:
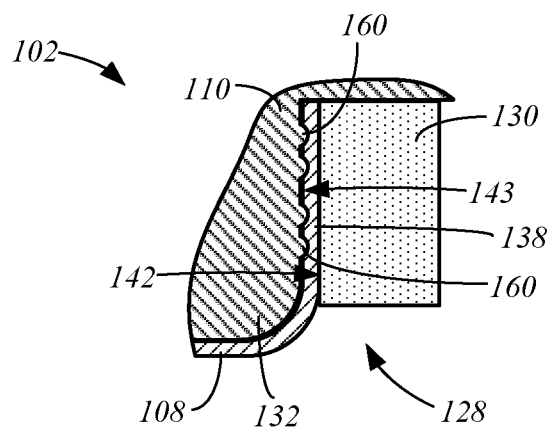

Under quiescent conditions, during which the ring member 130 and the flange 132 are generally not acted upon by significant outside forces and they are each at substantially the same temperature (e.g., ±5°), the ring member 130 has a shorter inner diameter 147 than the outer diameter 148 of the flange 132, as illustrated in FIG. 5A. When the ring member 130 and the flange 132 are aligned coaxially with the axis 140, the flange 132 extends past the inner wall 142 over an annular ring having a width 149. As a result, it is not possible to slide the ring member 130 over the flange 132 and the peripheral portion 138 of the diaphragm under these conditions.

Figure 5B:
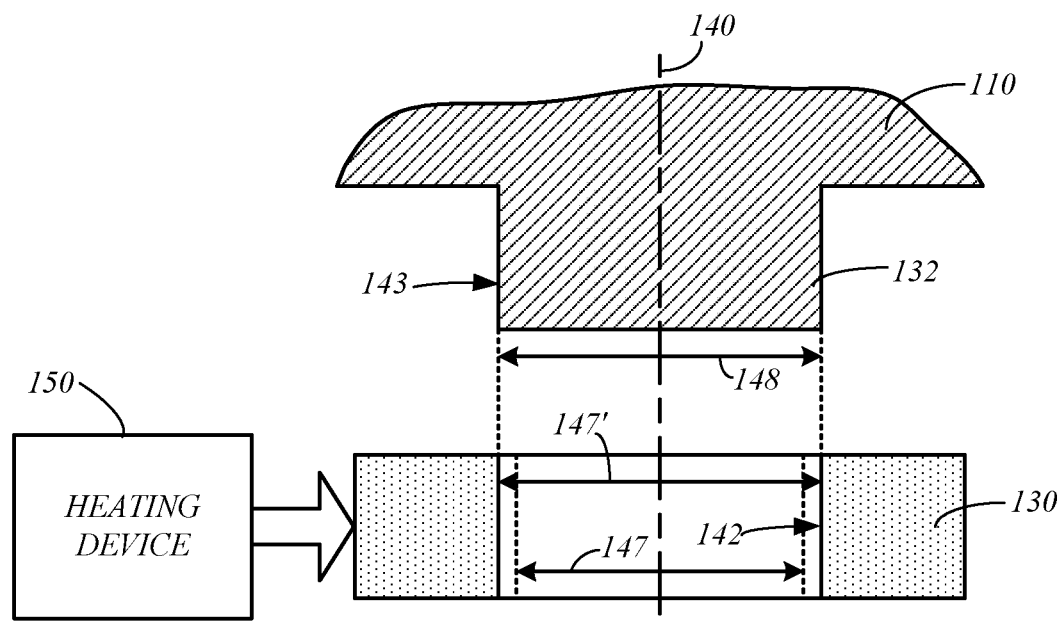
Figure 5C:
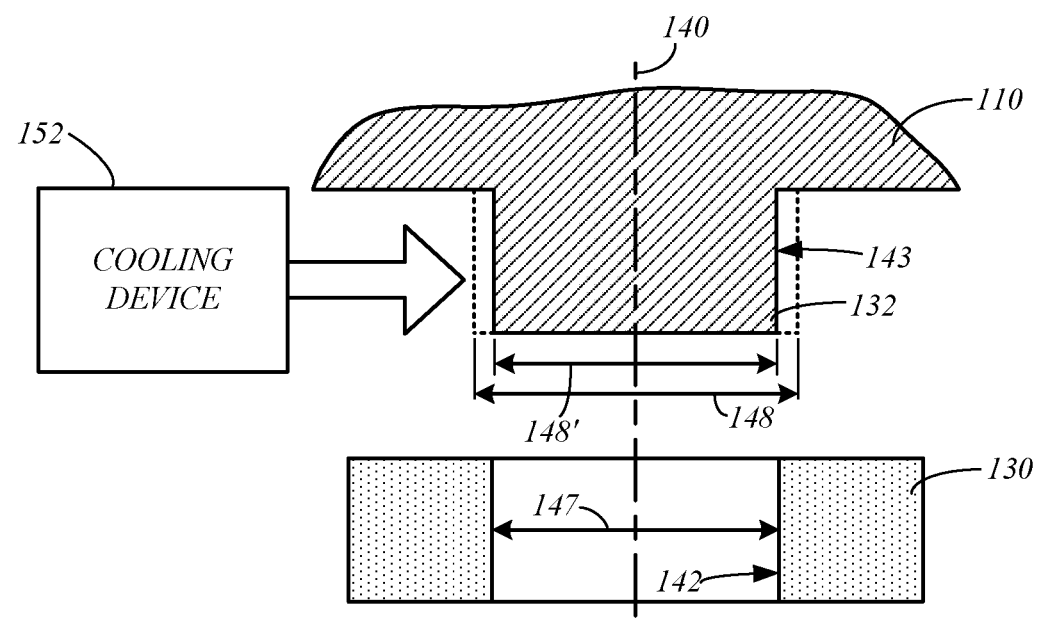

The seal body 110 and the ring member 130 are prepared for assembly by changing the relative inner and outer diameters 147 and 148, such that the inner diameter 147 of the ring member 130 is greater than the outer diameter 148 of the flange 132. This is accomplished by thermally expanding the ring member 130 by heating the ring member using a heating device 150, as shown in FIG. 5B, and/or thermally contracting the flange 132 by cooling the flange 132 or the entire seal body 110 using a cooling device 152, as shown in FIG. 5C. Thus, the assembly of the ring member 130 over the peripheral portion 138 of the diaphragm 108 and the flange 132 may be accomplished by the heating step illustrated in FIG. 5B, the cooling step illustrated in FIG. 5C, or both the heating and cooling steps.

The heating device 150 and the cooling device 152 may take on any suitable form. Exemplary heating devices 150 include an oven, an induction heating device, a torch, or another suitable heating device. Exemplary cooling devices 152 include a cooler, such as one utilizing liquid nitrogen or dry ice, or another suitable cooling device.

Figure 5D:
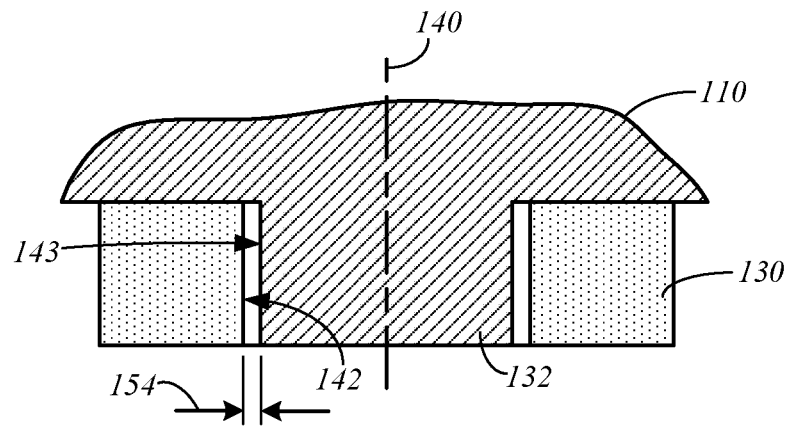

The thermal expansion of the ring member 130 increases the quiescent state diameter 147 (indicated in phantom lines) to an expanded diameter 147', as shown in FIG. 5B. The thermal contraction of the flange 132 decreases the quiescent state diameter 148 (indicated in phantom lines) to a contracted diameter 148', as shown in FIG. 5C. After sufficient thermal expansion of the ring member 130 and/or thermal contraction of the flange 132, a gap 154 is formed between the outer wall 143 of the flange 132 and the inner wall 142 of the ring member 130, as shown in FIGS. 5D and 6A. This allows the ring member 130 to be placed around the flange 132 and the peripheral portion 138 of the diaphragm, as shown in FIG. 6A.

As the relative temperature between the ring member 130 and the flange 132 or seal body 110 decreases due to the lowering of the temperature of the ring member 130 and/or the rising temperature of the flange 132, the gap 154 decreases due to the thermal contraction of the ring member 130 and/or the thermal expansion of the flange 132. As the temperature of the assembled diaphragm seal approaches equilibrium, the ring member 130 and the flange 132 counterbalance the thermal contraction and expansion forces to prevent further contraction of the ring member 130 and/or further expansion of the flange 132 toward their quiescent diameters 147 and 148. This results in the interference fit shown in FIGS. 3, 5E and 6B that produces a strong radial clamping or pinching force between the inner wall 142 of the ring member 130 and the outer wall 143 of the flange 132 that secures the peripheral portion 138 of the diaphragm 108 to the body 110, and forms a seal between the peripheral portion 138 and the outer wall 143 of the flange to seal the cavity 134. The clamping or pinching force is generally applied along a direction that is substantially perpendicular (e.g., ±5°) to the central axis 140.

Figure 7:
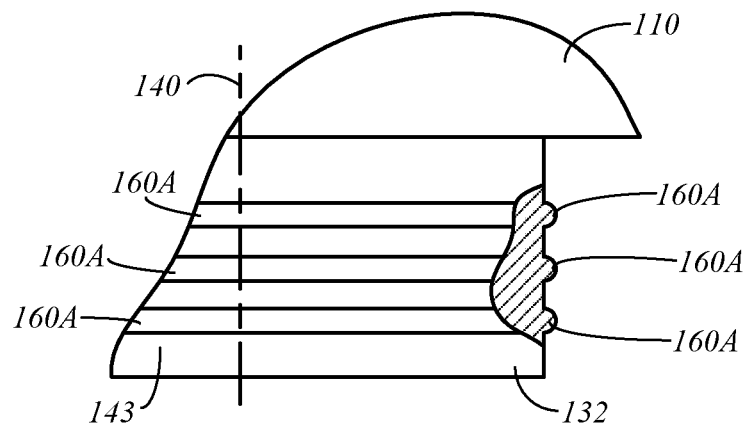
FIGS. 7 and 8 are front partial cross-sectional views of a portion of a seal body, in accordance with embodiments of the present disclosure.
Figure 8:
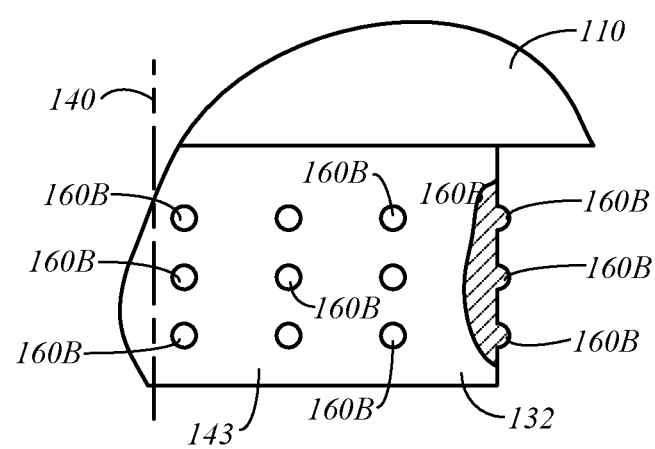

Some embodiments of the outer wall 143 of the flange 132 include one or more protrusions, generally referred to as 160, that extend substantially perpendicularly (e.g., ±5°) to the axis 140, as illustrated in FIGS. 7 and 8, which are front partial cross-sectional views of a portion of the seal body 110, in accordance with embodiments of the present disclosure. The one or more protrusions 160 may take on any suitable form.

In some embodiments, the protrusions 160 include at least one annular ridge 160A that surrounds the central axis 140, as shown in FIG. 7. In some embodiments, a plurality of the annular ridges 160A are formed on the outer wall 143 and are separated from each other along the axis 140, as shown in FIG. 7.

In some embodiments, the one or more protrusions 160 include one or more projections 160B that are displaced from each other on the outer wall 143, as shown in FIG. 8. The projections 160B on the outer wall 143 may be aligned along an axis extending perpendicularly to the axis 140 and/or aligned along an axis extending parallel to the axis 140, as shown in FIG. 8.

The one or more projections 160 can aid in the securement of the peripheral portion 138 of the diaphragm 108 to the flange 132. For example, when the diaphragm 108 is formed of a polymer or other deformable material, the interference fit 128 between the ring member 130 and the flange 132 compresses the peripheral portion 138 of the diaphragm 108 against the one or more protrusions 160, which deforms the peripheral portion 138 about the one or more protrusions 160, as shown in FIG. 6B. This further secures the peripheral portion 138 of the diaphragm 108 to the flange 132. Additionally, the deformation of the peripheral portion 138 can also improve the seal formed between the peripheral portion 138 and the outer wall 143 of the flange 132, such as when the one or more protrusions 160 include at least one annular ridge 160A (FIG. 7), for example.

Figure 9:
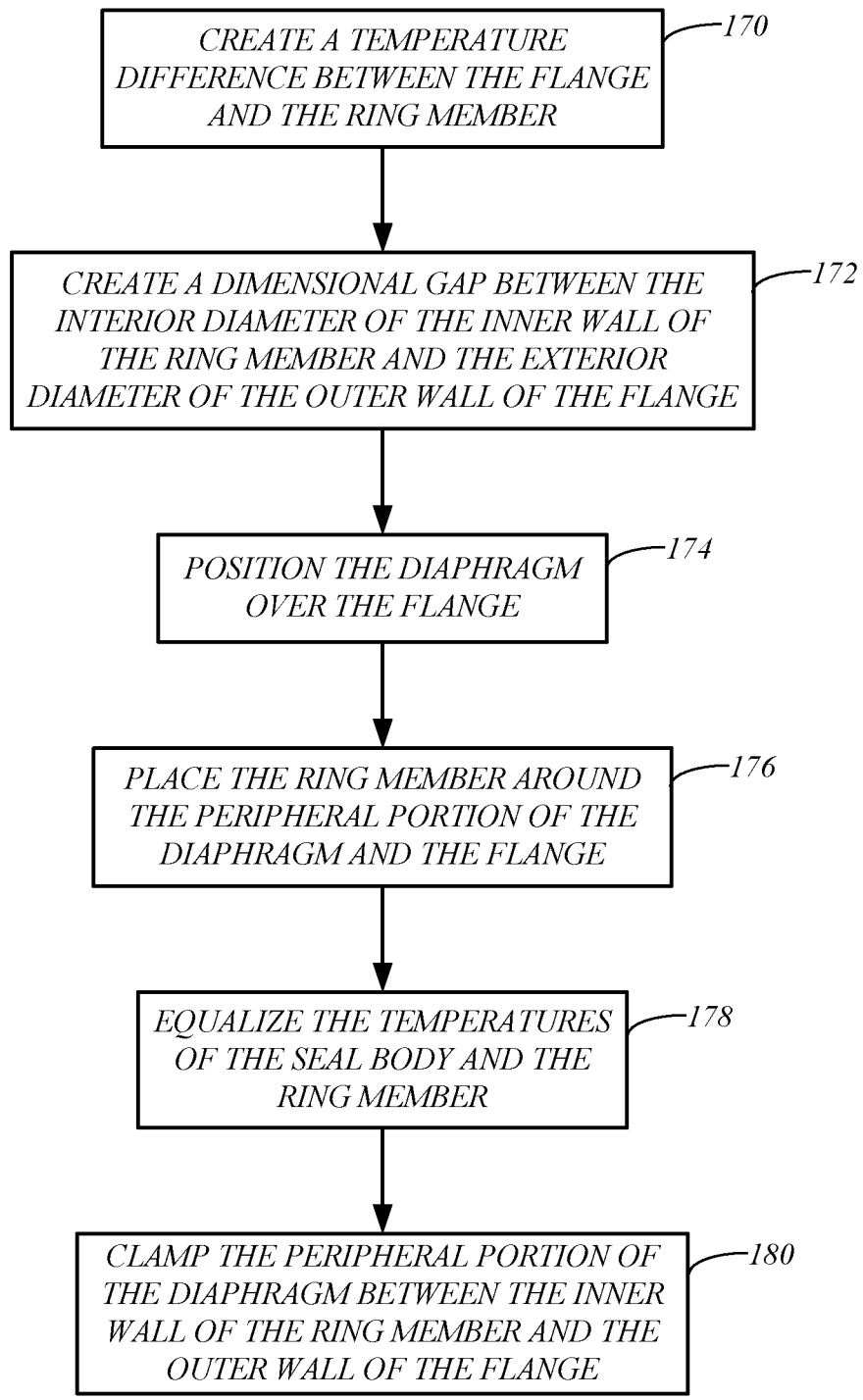
FIG. 9 is a flowchart illustrating an exemplary method of forming a process diaphragm seal, in accordance with embodiments of the present disclosure.

Some embodiments of the present disclosure are directed to a method of forming the process diaphragm seal 102. FIG. 9 is a flowchart illustrating exemplary embodiments of the method. At 170 of the method, a temperature difference is created between the flange 132 of the seal body 110 and the ring member 130. As discussed above with reference to FIGS. 5B and 5C, this temperature difference may be created by heating the ring member 130 using a heating device 150, as shown in FIG. 5B, and/or cooling the flange 132 or seal body 110 using a cooling device 152, as shown in FIG. 5C.

At 172 of the method, a dimensional gap is created between an interior diameter 147 of an inner wall 142 of the ring member, and an exterior diameter of an outer wall 143 of the flange 132 in response to step 170. This is generally illustrated in FIGS. 5B and 5C where the interior diameter 147 of the ring member 130 is increased relative to the outer diameter 148 of the flange 132, such that the quiescent diameter 147 or the expanded diameter 147' is greater than the quiescent diameter 148 or contracted diameter 148'.

The diaphragm 108 is positioned over the flange 132 at step 174 of the method. In some embodiments, an active portion 136 of the diaphragm 108 extends over the cavity 134 that is surrounded by the flange 132, and a peripheral portion 138 of the diaphragm 108 extends along the outer wall 143 of the flange 132.

At 176 of the method, the ring member is placed around the peripheral portion 138 of the diaphragm 108 and the flange 132, as shown in FIG. 5D. This is made possible by the formation of the gap 154 in step 172. This positions the peripheral portion 138 between the inner wall 142 of the ring member 130 and the outer wall 143 of the flange 132, as shown in FIGS. 3 and 6A. The temperatures of the flange 132 or seal body 110 and the ring member 130 are then substantially equalized (e.g., to within ±5° of each other), at 178 of the method. This may be accomplished by allowing the components to either cool down or heat up to room temperature, for example.

Figure 5E:
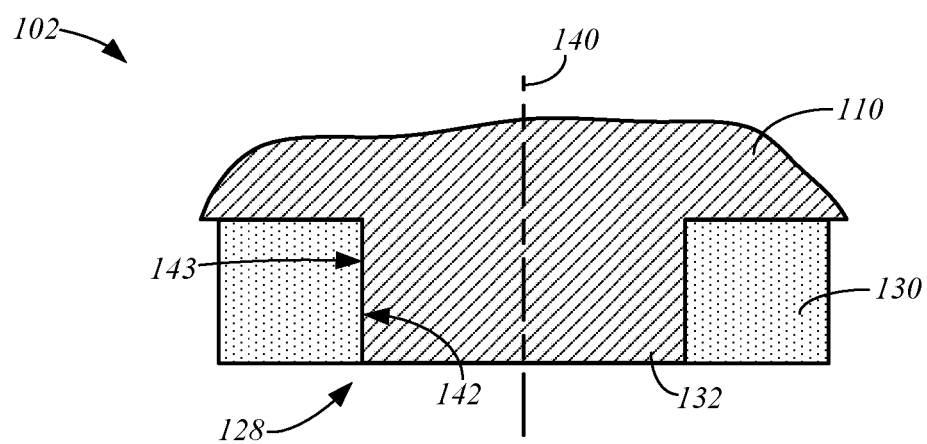

At 180, the peripheral portion 138 of the diaphragm 108 is clamped between the inner wall 142 of the ring member 130 and the outer wall 143 of the flange 132 in response to the equalization of the temperatures of the seal body 110 and the ring member 130 in step 178 to form the interference fit 128. This is generally illustrated in FIGS. 3, 5E and 6B. This clamping of the peripheral portion 138 of the diaphragm 108 also forms a seal between the peripheral portion 138 and the outer wall 143 of the flange 132, which prevents leakage of fill fluid 146 from the cavity 134 and also prevents the process material 105 from entering the cavity 134. This completes the formation of the process diaphragm seal 102.

Although the embodiments of the present disclosure have been described with reference to preferred embodiments, workers skilled in the art will recognize that changes may be made in form and detail without departing from the spirit and scope of the present disclosure.

What is claimed is:

1. A process diaphragm seal comprising:
 a seal body including a flange which projects from the seal body and surrounds a cavity;
 a diaphragm having an active portion extending over the cavity and a peripheral portion surrounding the active portion, the peripheral portion extending over an edge of the flange and around an outer wall of the flange; and
 a ring member clamping the peripheral portion of the diaphragm to the outer wall of the flange through an interference fit between an inner wall of the ring member and the outer wall of the flange, wherein a seal is formed between the peripheral portion of the diaphragm and the outer wall of the flange, wherein the peripheral portion of the diaphragm extends between the ring member and the outer wall of the flange;
 wherein the interference fit pinches the peripheral portion of the diaphragm against the outer wall of the flange;
 the outer wall of the flange includes at least one protrusion; and
 the interference fit deforms the peripheral portion of the diaphragm about the at least one protrusion.

2. The process diaphragm seal of claim 1, wherein:
 the active portion of the diaphragm extends substantially perpendicularly to a central axis;
 the peripheral portion of the diaphragm extends substantially parallel to the central axis; and
 the outer wall of the flange and the inner wall of the ring member extend substantially parallel to the central axis.

3. The process diaphragm seal of claim 2, wherein the outer wall of the flange and the inner wall of the ring member are cylindrical.

4. The process diaphragm seal of claim 1, wherein the at least one protrusion comprises at least one annular ridge surrounding the central axis.

5. The process diaphragm seal of claim 1, wherein the at least one protrusion comprises a plurality of projections.

6. The process diaphragm seal of claim 2, wherein the diaphragm comprises a polymer.

7. The process diaphragm seal of claim 2, wherein the diaphragm comprises a metal.

8. The process diaphragm seal of claim 2, wherein the ring member and the flange of the seal body are formed of substantially the same material.

9. A method of forming a process diaphragm seal comprising:
 creating a temperature difference between a flange of a seal body and a ring member, wherein the flange which projects from the seal body and surrounds a cavity of the seal body;
 creating a dimensional gap between an interior diameter of an inner wall of the ring member and an exterior diameter of an outer wall of the flange in response to creating the temperature difference;
 positioning a diaphragm over the flange, wherein an active portion of the diaphragm extends over the cavity and a peripheral portion of the diaphragm extends along the outer wall, the peripheral portion extending over an edge of the flange and around an outer wall of the flange;
 placing the ring member around the peripheral portion of the diaphragm and the flange, wherein the peripheral portion is between the inner wall of the ring member and the outer wall of the flange;
 substantially equalizing the temperatures of the seal body, the diaphragm and the ring member; and
 clamping the peripheral portion of the diaphragm between the inner wall of the ring member and the outer wall of the flange and forming a seal between the peripheral portion of the diaphragm and the outer wall of the flange in response to substantially equalizing the temperatures.

10. The method of claim 9, wherein changing a relative temperature between the flange of the seal body and the ring member comprises one of heating the ring member and cooling the flange.

11. The method of claim 9, wherein:
the active portion of the diaphragm extends substantially perpendicularly to a central axis;
the peripheral portion of the diaphragm extends substantially parallel to the central axis;
the outer wall of the flange and the inner wall of the ring member extend substantially parallel to the central axis; and
clamping the peripheral portion of the diaphragm comprises applying a pinching force against the diaphragm between the inner wall of the ring member and the outer wall of the flange, wherein the pinching force is applied along a plane that is substantially perpendicular to the central axis.

12. The method of claim 11, wherein:
the outer wall of the flange includes at least one protrusion extending perpendicularly to the central axis; and
clamping the peripheral portion of the diaphragm comprises deforming the peripheral portion of the diaphragm about the at least one protrusion.

13. The method of claim 12, wherein the at least one protrusion comprises at least one of an annular ridge surrounding the central axis and a projection.

14. An industrial process control system comprising:
a process vessel containing a process material;
a process diaphragm seal attached to the process vessel comprising:
    a seal body connected to the process vessel and including a flange which projects from the seal body and surrounds a cavity;
    a diaphragm having an active portion extending over the cavity and a peripheral portion surrounding the active portion, wherein the active portion has a first side that is exposed to the process material and a second side that is exposed to the cavity, the peripheral portion extending over an edge of the flange and around an outer wall of the flange; and
    a ring member clamps the peripheral portion of the diaphragm to the outer wall of the flange through an interference fit between an inner wall of the ring member and the outer wall of the flange, wherein a seal is formed between the peripheral portion of the diaphragm and the outer wall of the flange, wherein the peripheral portion of the diaphragm extends between the ring member and the outer wall of the flange, wherein the interference fit pinches the peripheral portion of the diaphragm against the outer wall of the flange, the outer wall of the flange includes at least one protrusion and the interference fit deforms the peripheral portion of the diaphragm about the at least one protrusion;
a fluid pathway coupled to the cavity, wherein the cavity and the fluid pathway are filled with a fluid; and
a process transmitter including a pressure sensor configured to sense a pressure in the process vessel through the diaphragm and the fluid.

15. The system of claim 14, wherein:
the active portion of the diaphragm extends substantially perpendicularly to a central axis;
the peripheral portion of the diaphragm extends substantially parallel to the central axis; and
the outer wall of the flange and the inner wall of the ring member extend substantially parallel to the central axis.

16. The system of claim 14, wherein the at least one protrusion comprises at least one of an annular ridge surrounding the central axis and a projection.

* * * * *